Oct. 7, 1941.    H. E. SLOAN ET AL    2,257,921
CHUCK JAW ACTUATING MECHANISM
Filed July 10, 1939    4 Sheets-Sheet 1

INVENTOR
Harry E. Sloan.
George A. Highberg.
by Arthur B. Jenkins
ATTORNEY

Oct. 7, 1941.   H. E. SLOAN ET AL   2,257,921
CHUCK JAW ACTUATING MECHANISM
Filed July 10, 1939   4 Sheets-Sheet 2
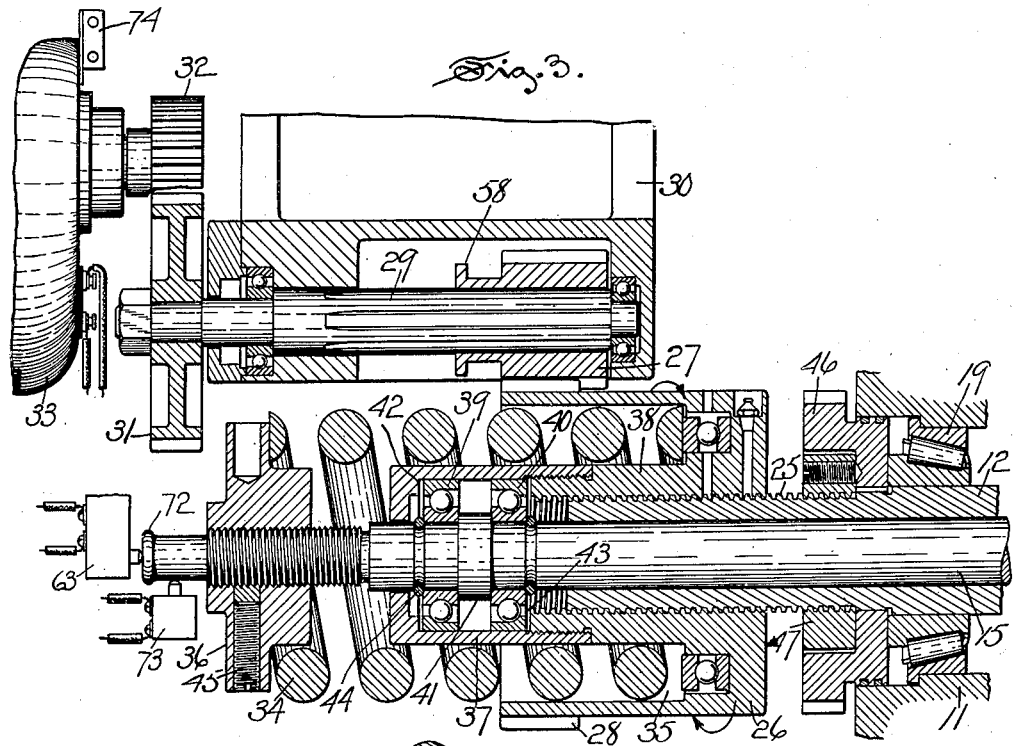
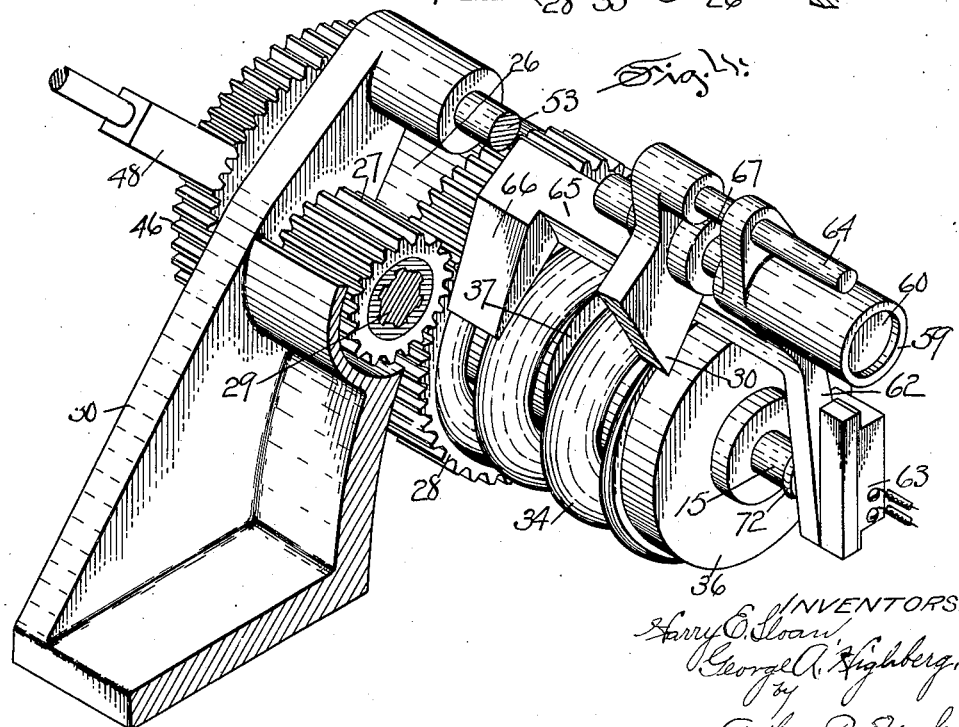

Oct. 7, 1941.     H. E. SLOAN ET AL     2,257,921
CHUCK JAW ACTUATING MECHANISM
Filed July 10, 1939     4 Sheets-Sheet 3
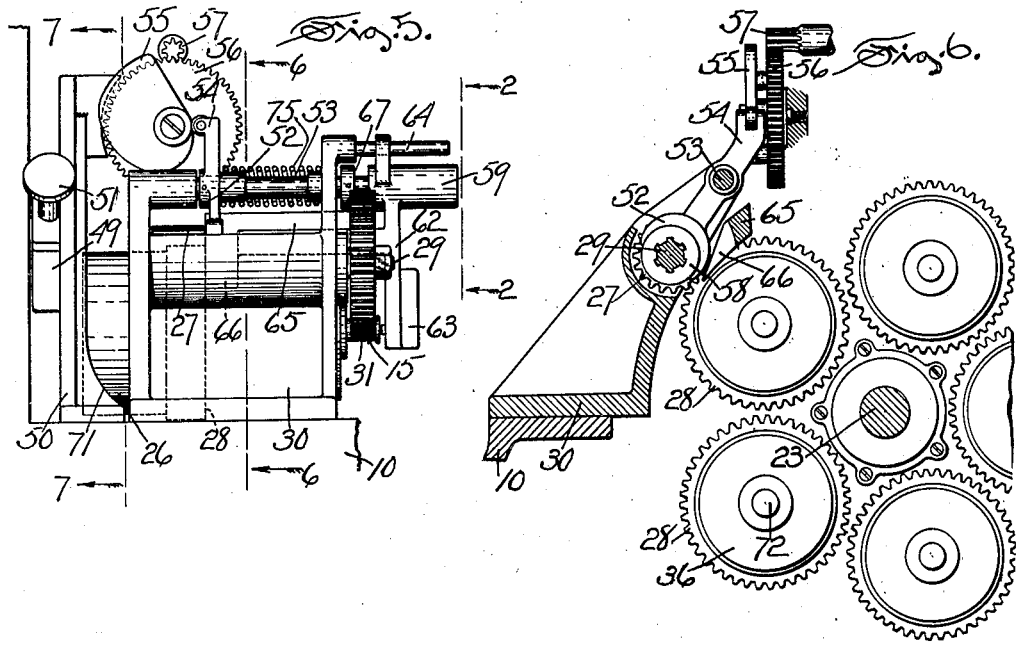
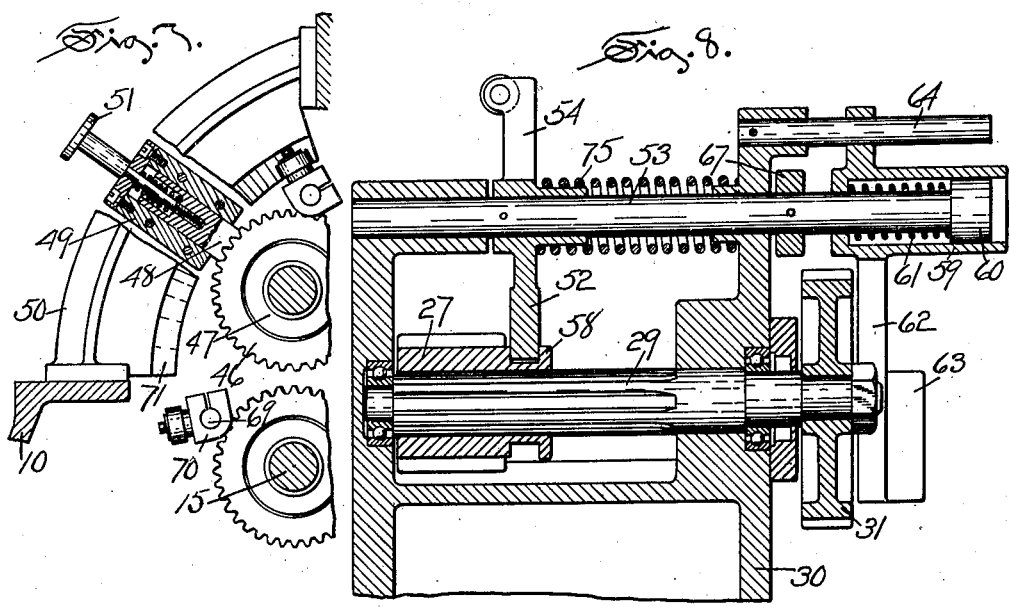
INVENTORS.
Harry E. Sloan,
George A. Highberg.
by
Arthur B. Jenkins
ATTORNEY Oct. 7, 1941.   H. E. SLOAN ET AL   2,257,921
CHUCK JAW ACTUATING MECHANISM
Filed July 10, 1939   4 Sheets-Sheet 4
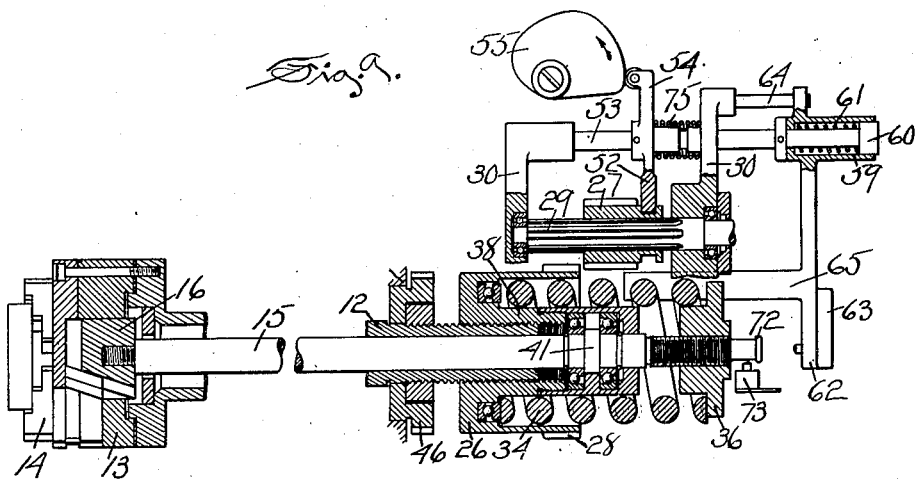
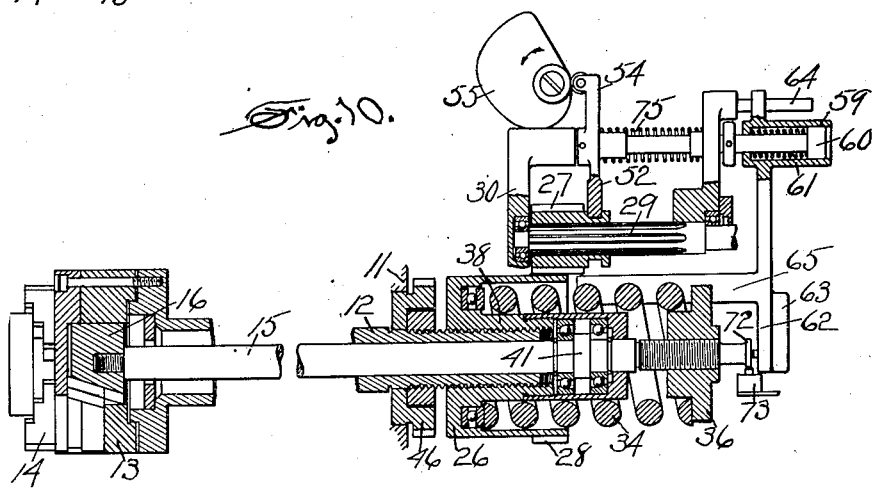
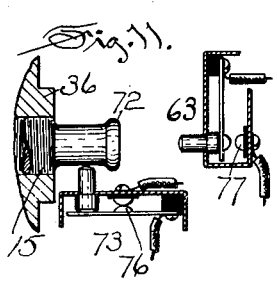 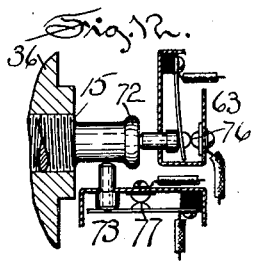 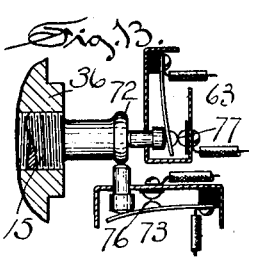
INVENTORS.
Harry E. Sloan
George A. Highberg.
by
Arthur B. Jenkins
ATTORNEY Patented Oct. 7, 1941

2,257,921

UNITED STATES PATENT OFFICE 2,257,921

CHUCK JAW ACTUATING MECHANISM

Harry E. Sloan, Hartford, and George A. Highberg, West Hartford, Conn., assignors to The Cushman Chuck Company, Hartford, Conn., a corporation of Connecticut Application July 10, 1939, Serial No. 283,640

18 Claims. (Cl. 279—1)

Our invention relates more particularly to that class of chucks embodying jaws radially movable on a chuck body, and especially to means for operating said jaws, and an object of our invention, among others, is the production of an apparatus of this type that is simple in construction and operation and particularly designed to eliminate undue strains upon the actuating mechanism in the operation of the chuck; and a further object of the invention is to provide for automatic operation of the jaw actuating mechanism.

One form of a chuck jaw actuating mechanism embodying our invention and in the construction and use of which the objects herein set out, as well as others, may be attained, is illustrated in the accompanying drawings, in which—

Figure 3 is a view on enlarged scale on a plane denoted by the dotted line 3—3 of Fig. 2.

Figure 4 is an isometric perspective view of the mechanism shown in Fig. 3 looking in a reverse direction and with parts cut away to show construction.

Figure 5 is a detail view on reduced scale illustrating mechanism for connecting the motor with the chuck actuating mechanism.

Figure 6 is a view in section on a plane denoted by the dotted line 6—6 of Fig. 5.

Figure 7 is a view in section on a plane denoted by the dotted line 7—7 of Fig. 5.

Figure 8 is a view in section on a plane denoted by the dotted line 8—8 of Fig. 2.

Figure 9 is a detail view illustrating the switches for terminating operation of the motor at the end of jaw opening and closing movements, the switches being in their normal positions.

Figure 10 is a similar view showing the switches in their relative operative positions.

Figure 11 is a detail view illustrating the relative positions of the switches in their inoperative positions.

Figure 12 is a similar view illustrating an intermediate relative location of the switches.

Figure 13 is another similar view illustrating the relative active locations and conditions of both switches.

In the accompanying drawings the numeral 10 denotes a portion of the frame of a machine in which a turret 11 is mounted for periodic rotation in a manner common to machines of this type, and by mechanism not herein specifically shown and described, but which will be readily understood by those skilled in the art, the periods of rest of the turret being for the purpose of securing work pieces in the chuck, for removing such pieces from the chuck, and for the operation of the tools of suitable character upon such pieces of work while held by the chucks in different positions thereof for the operation of such tools and in a manner that will be readily understood.

Our invention relates particularly to the construction and operation of the mechanism for closing and opening the chuck jaws to secure work pieces therein and to release such pieces therefrom, and the description herein will therefore be generally applied to the mechanism for operating the chuck jaws of one of the chucks only, such description applying equally well to each of the chucks supported in the turret.

Figure 1:
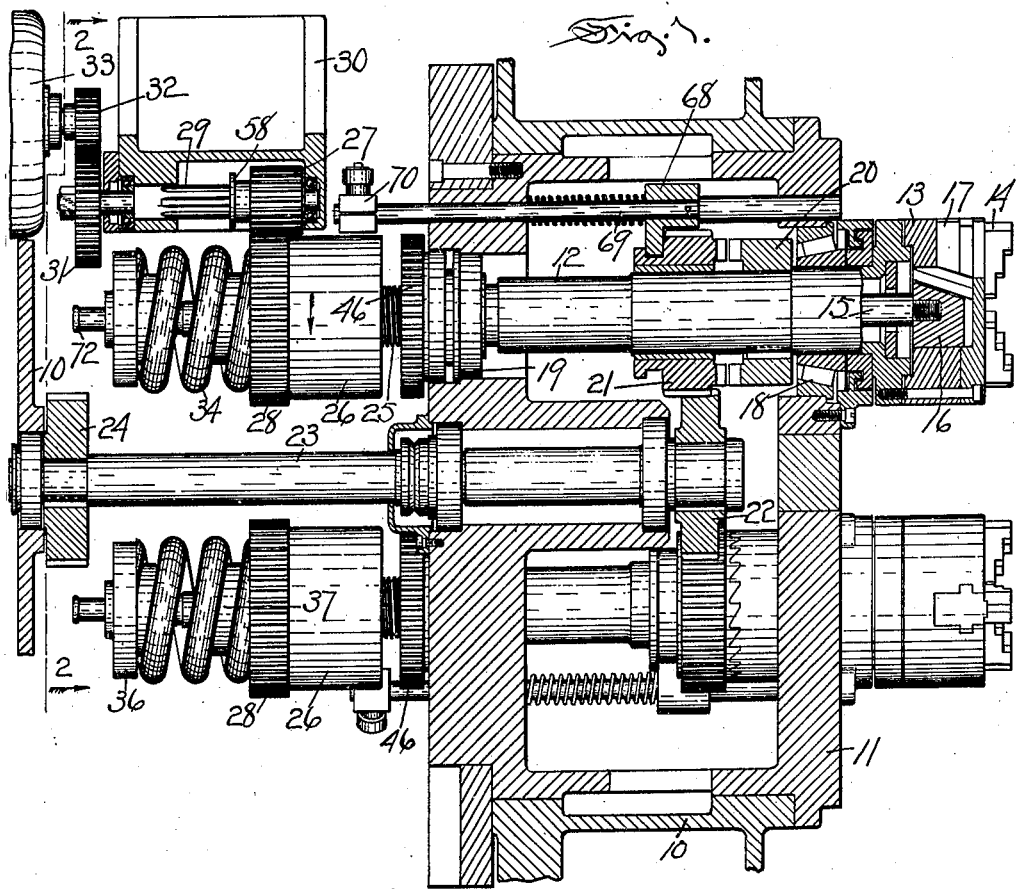
Figure 1 is a view in lengthwise section through a portion of a turret shown as supporting a number of chuck spindles embodying our invention and on a plane denoted by the dotted line 1—1 of Fig. 2.
Figure 2:
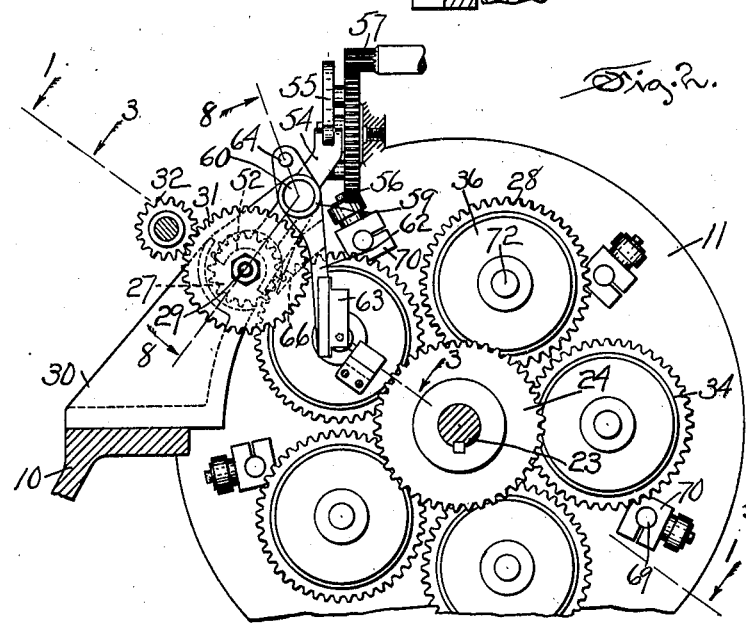
Figure 2 is a view in cross section in a plane denoted by the dotted lines 2—2 of Figs. 1 and 5.

Each of these mechanisms comprises a chuck spindle 12 which is rotatably mounted in the turret, there being any desired number of such spindles, five being shown herein. Each of these spindles has a chuck 13 secured thereto at its outer end with chuck jaws 14 radially movable on the face of the chuck, the term "chuck" being herein applied to the whole structure secured to and rotated by the spindle. These chucks may be of any suitable construction common to chucks of this type and having any suitable means for imparting radial movement to the chuck jaws, as by means of a draw bar 15 longitudinally movable in the spindle 12 and rotatable therewith. This connection of the draw bar with the chuck jaws comprises no part of the present invention and a more specific description thereof is omitted herein, it merely being noted that in the structure herein shown a chuck actuating head 16 has a cam connection with a jaw carrier 17 to which the chuck jaws are secured, this cam connection being such that when the head is moved in one direction the jaws will be closed and when moved in the opposite direction the jaws will be opened. In the specific structure herein shown when said head is moved backward or to the left, as seen in Fig. 1, the jaws will be closed, and when moved forward or to the right, the jaws will be opened. The spindle 12 is suitably mounted in roller bearings 18 and 19 at opposite ends of the turret, as shown in Fig. 1, and is periodically operated by means of a clutch comprising a driven clutch member 20 secured to the spindle and a driving clutch member 21 rotatable continuously on the spindle in a manner to be hereinafter described.

The two clutch members have intermeshing teeth in a manner common to clutches of this type and the driving clutch member is in the form of a gear having teeth meshing with the teeth of a spindle driving gear 22 secured to a spindle driving shaft 23 supported at one end by the turret, but rotatable independently thereof and supported at its opposite end by the frame 10, a pinion 24 being secured to said shaft as a means for rotating it, an intermeshing gear for driving said pinion not being shown herein.

The spindle 12 is threaded at 25 to receive the threads of an interiorly threaded drum 26 which is rotated with the spindle during its operation to drive the chuck but is also rotatable independently of the spindle for the purpose of actuating the draw bar 15 to operate the chuck jaws. This independent rotation of the drum 26 is effected by means of a pinion 27 the teeth of which mesh with teeth 28 on the drum, said pinion having splined engagement with a drum driving spindle 29, this splined engagement comprising a number of ribs on the spindle engaging with a number of grooves within the pinion as shown in Fig. 3. The spindle 29 is rotatably mounted as on ball bearings in a bracket 30 as shown in Fig. 8 secured to and supported by the frame 10, as shown in Figs. 5 and 6. This spindle is driven by means of a gear 31 and an intermeshing pinion 32, the latter being secured to the spindle of a motor 33 mounted in a stationary position on the frame of the machine. The motor is of the reversible type and may be intermittently operated by means of starting and stopping devices or switches manually or otherwise operated, in a manner to be hereinafter described.

A spring 34 surrounds the spindle 12 and the draw bar 15, said spring extending into an annular groove 35 in the drum 26 and thrusting with its opposite end against a stop or seat 36, as shown in Fig. 3.

This seat is secured by interengaging threads to the end of the draw bar 15, this affording means for varying the tension of the spring 34 and thereby graduating the force of the chuck jaws on a piece of work held thereby.

A housing 37 is secured, as by interengaging threads, to a hub 38 forming one wall of the groove 35 within the drum 26, as shown in Fig. 3, and ball bearings 39 and 40 are secured to opposite sides of and against a collar 41 on the draw bar 15, a space 42 being created between the ball bearing 39 and the end of the housing 37 and another space 43 occurring between the ball bearing 40 and the end of the hub 38, as shown in Fig. 3. Said ball bearings are secured against the collar 41 as by means of wire rings 44 secured in annular grooves in the draw bar 15, as shown in Fig. 3. The seat 36 is secured against rotation on the draw bar as by means of a set screw 45. A holding gear 46 is keyed to the spindle 12 and is otherwise secured thereon by a nut 47 within a recess in the gear and threaded on to the spindle 12, as shown in Fig. 3.

When the mechanism is actuated to open and close the chuck jaws it is essential that the spindle 12 be held against rotation, and the holding gear 46 is made use of at this time and for this purpose is engaged by a detent 48 (see Figs. 5 and 7). This detent is mounted in a box 49 on a bracket 50 supported by the frame 10, said detent being spring pressed into engagement with the teeth of the holding gears 46 on the several spindles, said gears passing into line with the detent as they are revolved by the rotation of the turret and at the times when the turret comes to rest. A finger piece 51 connected with the detent and projecting out of the box may be used as a means for manual operation of the detent. At the time the spindles 12 arrive in line with the detent said spindles are free to rotate, the clutch members 20 and 21 and the pinion 27 and drum gear 28 being disconnected, and this enables the teeth of the gears 46 to readily engage with the detent, and in the event of any obstruction at this time the detent is free to give way under the force of its spring to enable the teeth to engage.

The pinion 27 is shifted on the spindle 29 for engagement with and disengagement from the drum gear 28 by means of a fork 52 fast to a shifting rod 53 slidably mounted in the bracket 30, as shown in Figs. 5 and 8 of the drawings. This rod is spring pressed in a direction to engage said pinion and gear and to press a roller on a shifting rod actuating arm 54 into contact with a shifting cam 55 mounted on the frame of the machine together with a shifting gear 56 which operates to rotate said cam, said gear being in mesh with a shifting pinion 57 also rotatably mounted on the frame of the machine and operatively connected in any suitable manner with the driving mechanism of said machine, said connection not being shown herein. The fork 52 is engaged with a spool 58 fast to the pinion 27.

A limit switch support 59 is mounted at and on the end of the shifting rod 53, the latter having a head 60 forming a seat for a spring 61 for forcing the support backwardly on the rod. A supporting arm 62 for a limit switch 63 extends from the support 59, said switch being located opposite the end of the draw bar 15 when the latter is in position for operating the chuck jaws. A guide rod 64 is secured to the bracket 30 and projects through an ear on the support 59 to hold the limit switch in position, as shown in Fig. 8 of the drawings. An extension 65 from the limit switch support has a nose 66 positioned for contact with the end of the drum 26, as shown in Fig. 4 of the drawings. A collar 67 secured to the rod 53 is positioned to make contact with the support 59 and move it after the rod 53 has been moved to a certain extent.

The driving clutch member 21 is actuated by a clutch operating member 68 secured to a clutch operating rod 69 slidably mounted in the turret 11, as shown in Fig. 1, the outer end of the rod bearing a contact member 70 having a roller adapted to engage a clutch actuating cam 71 supported by the bracket 30, as shown in Fig. 7. The clutch operating member 68 is spring pressed in a direction to engage the two clutch members, and the cam 71 operates to disengage the clutch members. Said contact member engages with said cam when the turret is rotated and just before such rotation is stopped, so that the clutch members are disengaged to stop rotation of the spindles just after or about the time the turret comes to rest.

The operation of this chuck actuating mechanism is as follows. Let is be assumed that the turret has just been indexed, such movement disconnecting the clutch members 20 and 21 by engagement of the contact member 70 with the cam 71, as shown in Figs. 1 and 7 and the movement also engaging the holding gear 46 with the detent 48 to hold the spindle fast, as shown in Fig. 7. The parts now being in position as shown in Figs. 3 and 9, with the chuck jaws closed, but with the exception that the space 42 is closed and the space 43 is wide open the cam 55 promptly operates to permit shifting of the pinion 27 into engagement with the gear 28 on the drum 26 as shown in Fig. 10, said pinion and gear having been aligned by the indexing of the turret and the cam 55 being fashioned and operated to retain the parts in these positions for a period sufficient to permit the chuck to be unloaded and reloaded. This change of position of the shifting rod 53 also shifts the limit switch 63 into a position adjacent to the knob 72 on the end of the draw bar 15, this change being illustrated in Figs. 9 and 10. The shifting rod spring 75 forces the actuating arm 52 into contact with the cam 55 and the limit switch spring 61, which is weaker than the spring 75, forces the normally open limit switch 63 against the end of the draw bar 15, thereby closing this switch.

A button of the manually operated switch 74 is now actuated to start the motor 33 in a direction to rotate the drum 26 in the direction indicated by the arrows in Figs. 1 and 3. This rotation of the drum and the housing 37 secured to its hub operates to move the drum and housing to the right, as seen in Fig. 3. The first part of this movement will close the gap or space 42 and open wide the gap 43 thereby causing pressure upon the ball bearing 39 and hence upon the collar 41 and movement of the draw bar 15, which thereupon opens the chuck jaws. The movement of the draw bar just described causes the knob 72 on the end of the draw bar to encounter a normally closed switch 73 as shown in Fig. 10, which switch controls an electric circuit for the motor 33, said switch being thereby operated to break the circuit and stop the motor. This limit switch and the limit switch 63 hereinbefore described are employed to stop operation of the drum with different parts of the mechanism in proper position.

In machines of this class the operation of the general mechanism is continuous, the turret being intermittently rotated and the periods of rest being sufficient to enable work pieces to be removed from the grasp of the chuck jaws and other work pieces to be placed between such jaws, during these periods of rest operation upon work pieces held by other chucks being performed.

Continuing the description of the operation, a piece of work having been removed from the chuck jaws and a new piece of work inserted therein, a button other than that before described of the manually operated switch 74 is pressed to start the motor, but in a reverse direction to that above mentioned, as hereinbefore stated the motor being reversible to rotate in opposite directions. The drum 26 is now rotated in a direction opposite to that denoted by the arrows in Fig. 3 hereinbefore referred to, with the result that the drum 26 is moved to the left from its position to open the jaws above described. The spring 34 which is constantly under proper tension exerts its pressure upon the draw bar 15 with the result that as the housing 37 moves to the left it is followed by movement of the draw bar in the same direction carrying with it the bearings 39—40, see Fig. 3. As movement of the draw bar stops owing to pressure of the chuck jaws upon the piece of work, continued movement of the housing opens the space 42 to its normal width and the pressure of the chuck jaws upon the piece of work to hold the latter in place while work is being performed thereon is that exerted by the spring 34, and, as hereinbefore noted this pressure may be graduated by adjustment of the stop or seat 36. Just after the motor stops the cam 55 operates the shifting mechanism hereinbefore described to disengage the pinion 27 from the gear 28, whereupon the turret is rotated to bring another spindle into the position of that just described. In this movement the contact member 70 is disengaged from the cam 71, the clutch parts connect, and rotation of the spindle just described is resumed, and the operation just set out is repeated upon the next spindle as it comes into position.

The limit switch spring 61 operates to hold the switch 63 against the end of the draw bar 15 to keep the switch closed during the operation of closing the chuck jaws, the nose 66 at the end of the supporting arm 62 for said switch being thus maintained closely adjacent the end of the drum 26 during this time. As the drum 26 rotates on the thread of the chuck spindle 12 to close the chuck jaws its end presses against the nose 66 and at the end of such operation moves the arm 62 and separates the switch 63 from the end of the draw bar, thereby permitting the switch to open to its normally open condition, thereby breaking the circuit and causing the motor to stop with the chuck jaws closed. Immediately following this the cam 55 operates to disengage the pinion 27 from the gear 28 and at the same time restoring the switch 63 to its normal position of rest, as shown in Fig. 9. In this jaw closing operation the draw bar 15 is moved back to its normal position of rest, thereby disengaging the switch 73 from the knob 72 and permitting the switch to close to its normally closed condition in readiness for a resumption of the operation, as shown in Fig. 9.

The structure of the switches 63, 73 and 74 has not been specifically set out herein as they are of common construction purchaseable upon the open market and will be readily understood by those skilled in the art, and the electrical connections between the switches and with the motor will also be readily understood by electricians and those skilled in the operation of machines of this type, it merely being noted that operation of one of the push buttons of the switch 74 conditions the circuit for operation through the normally closed switch 73 to start the motor and rotate it in one direction to open the chuck jaws, said switch being opened to break the circuit by operation of the button 72 when the jaws have been opened, and operation of the other push button of the switch 74 conditions the circuit for operation through the normally open switch 63, which has been temporarily closed by operation of the spring 61, to rotate the motor in the opposite direction to close the chuck jaws, the switch 73 being retained in its opened position and the switch 63 being retained in its closed position only during the operation of opening and closing the chuck jaws.

The relative positions of the switches 73 and 63 and the members for operating them and the relative conditions of the switches at different times are graphically illustrated in Figs. 11 to 13. The normal positions of rest, or inoperative positions, are illustrated in Fig. 11 wherein the switch 73 is shown in its normally closed condition with the contacts 76 engaged and the switch 63 is shown in its normally opened condition with the contacts 77 separated. The relative positions of the switches in readiness for the chuck jaw opening and closing operations are shown in Fig. 12 wherein the cam 55 has positioned the switch 63 against the button 72 and closed said switch, the contact 77 being engaged ready for operation and the switch 73 is in the same position as in Fig. 11 and closed ready for operation. In Fig. 13 the relative positions of the switches are shown just after a jaw opening movement effected by the operation of the switch 74 in a cycle of jaw opening and closing operations. The switch 73 has been opened to stop operation after the jaws have been opened and the switch 63 is yet in closed position for a second operation of the switch 74 for a jaw closing movement which will be terminated by pressure of the drum 26 against the nose 66 of the switch supporting arm 62 to move the switch away from the button 72 and permit it to open, this jaw closing movement and the subsequent movement of the arm 62 by operation of the cam 55 to disengage the pinion 27 and gear 28 restoring the switches to their relative positions and conditions, as shown in Fig. 11, ready for a repeated operation.

We claim:

1. A chuck jaw actuating mechanism including a threaded chuck spindle for the support of a chuck, a draw bar operatively connected with said chuck to actuate chuck jaws thereon, said draw bar extending within said spindle, a draw bar actuator surrounding said spindle and engaged with said thread, an operative connection between said actuator and draw bar for operation of the latter by the former, said connection providing for movement of the actuator independently of the draw bar, a spring surrounding said draw bar and thrusting in opposite directions against said bar and said actuator, and means for driving said actuator.

2. A chuck jaw actuating mechanism including a threaded chuck spindle for the support of a chuck, a draw bar operatively connected with said chuck to actuate chuck jaws thereon, said bar extending within said spindle, a draw bar actuator surrounding said spindle and engaged with said thread, an operative connection between said actuator and draw bar for operation of the latter by the former, said connection providing for movement of the actuator independently of the draw bar, a spring surrounding said draw bar and thrusting in opposite directions against said bar and said actuator, means for driving said actuator, means for driving said spindle, means for disengaging said spindle from its driving means, and means for holding said spindle against rotation during the operation of opening and closing said chuck jaws.

3. A chuck jaw actuating mechanism including a threaded chuck spindle for the support of a chuck, a draw bar operatively connected with said chuck to actuate chuck jaws thereon, said draw bar extending within said spindle, a draw bar actuator surrounding said spindle and engaged with said thread, an operative connection between said actuator and draw bar for operation of the latter by the former, said connection providing for movement of the actuator independently of the draw bar, a spring surrounding said draw bar and thrusting in opposite directions against said bar and said actuator, means for driving said actuator, and means for connecting said driving means with and for disconnecting it from said actuator.

4. A chuck jaw actuating mechanism including a threaded chuck spindle for the support of a chuck, a draw bar operatively connected with said chuck to actuate chuck jaws thereon, said draw bar extending within said spindle, a draw bar actuator surrounding said spindle and engaged with said thread, an operative connection between said actuator and draw bar for operation of the latter by the former, said connection providing for movement of the actuator independently of the draw bar, a spring surrounding said draw bar and thrusting in opposite directions against said bar and said actuator, means for driving said actuator, means for driving said spindle, means for disconnecting said spindle from its driving means, means for revolving said spindle, a toothed holding member secured to said spindle, and a toothed detent located in the path of said holding member to engage the teeth thereon in said revolving movement and when the spindle has been disconnected from its driving means.

5. A chuck jaw actuating mechanism including a threaded chuck spindle for the support of a chuck, a draw bar operatively connected with said chuck to actuate chuck jaws thereon, said bar extending within said spindle, a draw bar actuator surrounding said spindle and engaged with said thread, an operative connection between said actuator and draw bar for operation of the latter by the former, said connection including a collar on the draw bar normally spaced from said actuator to provide for movement of the actuator independently of the draw bar, a spring surrounding said bar and exerting pressure on both said actuator and bar, and means for driving said actuator.

6. A chuck jaw actuating mechanism including a threaded chuck spindle for the support of a chuck, a draw bar operatively connected with said chuck to actuate chuck jaws thereon, said bar extending within said spindle, a draw bar actuator surrounding said spindle and engaged with said thread, an operative connection between said actuator and draw bar for operation of the latter by the former, said connection including a collar on said draw bar and a ball bearing seated against said collar and spaced from said actuator to provide for movement of the actuator independently of the draw bar, a spring surrounding said draw bar and thrusting in opposite directions against said bar and said actuator, and means for driving said spindle.

7. A chuck jaw actuating mechanism including a threaded chuck spindle for the support of a chuck, a draw bar operatively connected with said chuck to actuate chuck jaws thereon, said bar extending within said spindle, a draw bar actuator surrounding said spindle and engaged with said thread, a seat for a spring adjustably secured to said draw bar, a spring thrusting in opposite directions against said seat and said actuator, an operative connection between said actuator and draw bar for operation of the latter by the former, said connection providing for movement of the actuator independently of the draw bar, and means for driving said actuator.

8. A chuck jaw actuating mechanism including a threaded chuck spindle for the support of a chuck, a draw bar operatively connected with said chuck to actuate chuck jaws thereon, said bar extending within said spindle, a draw bar actuator surrounding said spindle and having a hub threadedly engaged with said spindle and providing an annular chamber, an operative connection between said actuator and draw bar for operation of the latter by the former, said connection providing for movement of the actuator independently of the draw bar, a spring seat adjustably engaged with the draw bar, a spring having one end housed within said annular chamber and thrusting in opposite directions against said spring seat and the bottom of said chamber, and means for rotating said actuator.

9. A chuck jaw actuating mechanism including a threaded chuck spindle for the support of a chuck, a draw bar operatively connected with said chuck to actuate chuck jaws thereon, said draw bar extending within said spindle, a draw bar actuator surrounding said spindle and engaged with said thread and including a housing secured to one end thereof, an operative connection between said actuator and draw bar for operation of the latter by the former, said connection including members within said housing arranged to provide for movement of the actuator independently of the draw bar, a spring surrounding said draw bar and thrusting in opposite directions against said bar and said actuator, and means for driving said actuator.

10. A chuck jaw actuating mechanism including a threaded chuck spindle for the support of a chuck, a draw bar operatively connected with said chuck to actuate chuck jaws thereon, said bar extending within said spindle, a draw bar actuator surrounding said spindle and engaged with said thread, a shoulder on said draw bar, a ball bearing seated against said shoulder within said actuator and normally spaced from said actuator to provide for movement of the actuator independently of the draw bar, a spring exerting its force in opposite directions against said actuator and draw bar, and means for rotating said actuator to close said space and thereby operate said draw bar.

11. A chuck jaw actuating mechanism including a threaded chuck spindle for the support of a chuck, a draw bar in said spindle operatively connected with said chuck to actuate chuck jaws thereon, said draw bar extending within said spindle, a draw bar actuator surrounding said spindle and engaged with said thread, an operative connection between said actuator and draw bar for operation of the latter by the former, said connection providing for movement of the actuator independently of the draw bar, a spring surrounding said draw bar and thrusting in opposite directions against said bar and said actuator, teeth secured to said actuator, an actuator driving spindle, a pinion splined to said actuator driving spindle, and means for shifting said pinion into and out of engagement with the teeth on said actuator.

12. A chuck jaw actuating mechanism including a threaded chuck spindle for the support of a chuck, a draw bar operatively connected with said chuck to actuate chuck jaws thereon, said draw bar extending within said spindle, a draw bar actuator surrounding said spindle and engaged with said thread and having a hub and an outer shell creating an annular recess, said actuator including a housing removably secured to said hub, a spring seat secured to said draw bar, a spring thrusting in opposite directions against said seat and against the bottom of said recess, a collar on said draw bar, ball bearings seated against opposite sides of said collar and positioned to create spaces between said bearings and the end of said hub and said housing to provide for movement of the actuator independently of the draw bar, and means for driving said actuator.

13. A chuck jaw actuating mechanism including a chuck spindle for support of a chuck, interconnected movably mounted members including a draw bar operatively connected with the chuck jaws of said chuck for operating them, a formation on the end of said draw bar, a motor operatively connected with said movably mounted members for operating them to open and close the chuck jaws, contacts switches, one located at the side and the other at the end of the formation on the draw bar and each including an actuator positioned for engagement with said formation which is shaped to move said actuators in transverse directions one with respect to the other to operate the contacts of said switches, and an electrical connection between said switches and said motor.

14. A chuck jaw actuating mechanism including a chuck spindle for support of a chuck, interconnected movably mounted members including a draw bar operatively connected with the chuck jaws of said chuck for operating them, a formation comprising the end of said draw bar, a motor operatively connected with said movably mounted members for operating them to open and close the chuck jaws, a contact switch normally open independently of any action of the draw bar, a contact switch normally closed independently of any action of the draw bar, each of said switches including an actuator for operating its contacts, and said switches being located for engagement of their actuators alternately with said formation for alternate operation thereby to change the conditions of the contacts therein and a continuously uninterrupted electrical connection between said switches and said motor.

15. A chuck jaw actuating mechanism including a chuck spindle for support of a chuck, interconnected movably mounted members including a draw bar operatively connected with the chuck jaws of said chuck for operating them, a formation on the end of said draw bar, a motor operatively connected with said movably mounted members for operating them to open and close the chuck jaws, a switch normally open independently of any action of the draw bar and including an actuator therefor positioned for engagement with said formation to close said switch for operation of a jaw movement, a second switch normally closed independently of any action of the draw bar and positioned for engagement with said formation to open said last mentioned switch on completion of another and different jaw movement and a continuously uninterrupted electrical connection between said switches and said motor.

16. A chuck jaw actuating mechanism including a chuck spindle for support of a chuck, interconnected movably mounted members operatively connected with chuck jaws on said chuck for operating them, a motor operatively connected with said movably mounted members for operating them to effect opening and closing movements of the chuck jaws, a manually actuated switch connected to condition a circuit for supply of electricity to said motor, a mechanically actuated contact switch including a contact actuator and contacts for controlling said circuit, said last mentioned switch including said actuator being movably mounted independently of said movably mounted members into a position for operation thereby, said actuator being thus located in the path of movement of one of said movably mounted members for operation thereby, means to separate said contacts and open said circuit upon completion of a jaw movement, and a second switch isolated from the first mentioned switch and positioned for engagement with one of said movably mounted members for operation thereby to control the other of said jaw movements.

17. A chuck jaw actuating mechanism including a chuck spindle for support of a chuck, interconnected movably mounted members including a draw bar operatively connected with the chuck jaws of said chuck for operating them, a motor operatively connected with said movably mounted members for operating them to open and close the chuck jaws, a movably mounted contact switch including an actuator for operation of the contacts of said switch, means for moving said switch into position for engagement by said draw bar for operation of said actuator, and an electrical connection between said switch and said motor.

18. A chuck jaw actuating mechanism including a chuck spindle for support of a chuck, interengaged movably mounted members including a draw bar operatively connected with the chuck jaws of said chuck for operating them, a formation comprising the end of said draw bar, a motor operatively connected with said movably mounted members for operating them to open and close the chuck jaws, a normally open switch including an actuator therefor adapted to be positioned for engagement with said formation to close said switch for operation of a jaw movement, a second normally closed switch positioned for engagement with said formation to open said last mentioned switch on completion of a jaw movement, means for effecting a closed condition of both of said switches at the same time, and electrical connections between said switches and said motor.

HARRY E. SLOAN.
GEORGE A. HIGHBERG.